United States Patent [19]

Hesse

[11] 4,397,818
[45] Aug. 9, 1983

[54] CRACKING TUBE APPARATUS HAVING MOLDED OR SHAPED CATALYST BODIES

[75] Inventor: Klaus Hesse, Olpe, Fed. Rep. of Germany

[73] Assignee: GHT Gesellschaft für Hochtemperaturreaktor-Technik mbH, Bergisch Gladbach, Fed. Rep. of Germany

[21] Appl. No.: 298,766

[22] Filed: Sep. 2, 1981

[30] Foreign Application Priority Data

Sep. 11, 1980 [DE] Fed. Rep. of Germany ....... 3034208

[51] Int. Cl.³ .............................................. B01J 8/06
[52] U.S. Cl. .................................... 422/312; 422/197
[58] Field of Search ............... 422/181, 192, 193, 195, 422/197, 218, 220, 222, 312; 208/132

[56] References Cited

U.S. PATENT DOCUMENTS 3,871,445  3/1975  Wanka et al. ....................... 422/197

FOREIGN PATENT DOCUMENTS 272608   7/1913  Fed. Rep. of Germany ...... 422/193
1946741  9/1969  Fed. Rep. of Germany .
2507937  2/1975  Fed. Rep. of Germany .
2634534  2/1978  Fed. Rep. of Germany ...... 422/312
2634600  2/1978  Fed. Rep. of Germany ...... 422/197

Primary Examiner—David L. Lacey
Attorney, Agent, or Firm—Herbert L. Lerner; Laurence A. Greenberg

[57] ABSTRACT

Cracking tubes are closed at one end and externally heated contain catalyst bodies for the catalytic cracking of process gases and also contain a central inner tube for introduction or return of the gases. Molded catalyst bodies of two different shapes are arranged in the space between the two tubes such that the two shaped bodies alternate. The molded bodies of one shape are centered at the inner tube and leave an annular space between themselves and the outer tube. The molded bodies of the other shape are constructed so as to start at the outer tube and leave an annular space between themselves and the inner tube. Thus, the process gases passing between the two tubes in contact with the catalyst bodies flows in meander fashion from the outer to the inner tube and then to the outer tube. One or both of the two molded bodies have several radial ribs for axial spacing. Each section of ribs has openings in the radial direction for flow of gases between the outer surface of the inner tube and the inner surface of the outer tube.

5 Claims, 4 Drawing Figures

CRACKING TUBE APPARATUS HAVING MOLDED OR SHAPED CATALYST BODIES

BACKGROUND OF THE INVENTION

1. Field of the Invention

The present invention relates to a cracking tube with molded or shaped catalyst bodies for the catalytic cracking of process gases such as hydrocarbon gases, particularly natural gas, in elongated cracking tubes which can be heated from the outside and are closed at one end. The cracking tube contains a central inner tube for removing the process gases. The molded bodies are lined up along this inner tube.

2. Description of the Prior Art

These cracking tubes containing catalyst bodies are used for charging a tube cracking furnace with catalyst. They are frequently fastened at their upper end to a common carrier plate, are closed off at their lower end, and are heated from the outside with hot gases, for instance, with helium at about 950° C. from a nuclear reactor cooling loop. In the chemical industry, cracking tubes with an inner tube are used in which the space between the inner tube and the outer tube is filled with numerous small molded catalyst bodies in a loose bed. These beds, however, cause a pressure loss or pressure drop of gas flowing through the beds, which pressure drop cannot be calculated with reasonable exactitude and is often different. In German Published Non-Prosecuted Application Nos. 19 46 741 and 25 07 937 approximately cylindrical molded bodies were proposed, which are lined up on the inner tube and have numerous axis-parallel openings for the passage of the process gases. In German Published Non-Prosecuted Application No. 25 07 937 an upper side of the one disc or washer fit the underside of the next washer, so that these washers are fixed with respect to each other in the circumferential direction. Thereby, the washers are secured against rotation.

In both cases, however, the desirable and necessary heat transfer from the inner tube to the process gas is disturbed because the latter is surrounded almost along its entire length by the central part of the molded body which has an insulating effect. In addition, in both cases, a non-uniform temperature and velocity profile develops over the cross section of the tube because the process gas of necessity flows faster at the hot outer tube. However, the temperature of the process gas should desirably be uniform in the furnace to effect more complete cracking or decomposition of the gas.

SUMMARY OF THE INVENTION

An object of the present invention is to provide a cracking tube with the shaped catalyst bodies contained therein to improve the heat exchange between the inner tube and the process gas or the molded body and obtain a uniform temperature across the cross section of the catalyst.

With the foregoing and other objects in view, there is provided in accordance with the invention a cracking tube with catalyst bodies for the catalytic cracking of gases comprising an elongated outer tube closed at one end and which can be externally heated, a concentric inner tube of smaller diameter than the outer tube disposed in the outer tube for passage of the gases after contact with catalyst in the outer tube, an annular space between the outside surface of the inner tube and the inside surface of the outer tube, the combination therewith of (a) first shaped catalyst bodies and second different shaped catalyst bodies alternately arranged in the annular space, (b) said first shaped catalyst bodies extending radially outwardly across the annular space from adjacent the inner tube to leave a reduced empty annular space between the first shaped catalyst bodies and the outer tube, (c) said second shaped catalyst bodies extending radially inwardly across the annular space from adjacent the outer tube to leave a reduced empty annular space between the second shaped catalyst and the inner tube, thereby causing gases passed through the annular space in contact with the catalysts therein to flow in meander fashion from the outer to the inner tube and then to the outer tube, and (d) at least one of said first and second shaped bodies having a plurality of radial ribs for axial spacing with openings between ribs to permit flow of gases in the radial direction.

Other features which are considered as characteristic for the invention are set forth in the appended claims.

Although the invention is illustrated and described herein as embodied in a cracking tube with molded or shaped catalyst bodies, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which:

FIG. 1 diagrammatically illustrates a vertical longitudinal section of the invention showing an outer cracking tube, an inner tube, and first shaped catalyst bodies and second different shaped catalyst bodies arranged between the outer tube and the inner tube and alternately stacked on top of each other.

DETAILED DESCRIPTION OF THE INVENTION

In the cracking tube of the invention a small pressure loss for the process gas is more than compensated by a large heat exchange surface and high heat transfer. Although the process gas may flow upward through the space between the outer tube and inner tube and then down through the inner tube, it is desirable that the hot process gas flow upward in the inner tube wherein it is cooled down by the colder process gas flowing down between the outer tube and the inner tube according to the counterflow principle, so that the temperature stress of the support plate becomes less and a regenerative heat exchanger outside the cracking tube can become smaller or be eliminated.

The cracking tube, according to the invention, contains formed bodies of two different shapes which are lined up alternatingly on top of each other. One formed body, similar to a disk with a central hole, is centered on the inner tube with a small gap and also forms between the catalyst body and the outer tube a free or unobstructed annular cross section for the passage of the process gas. The other formed body, similar to the first body but with a greater diameter and larger hole, is likewise centered but with a small gap at the outer tube and also forms a free annular cross section for the process gas between the other formed body and the inner tube. The small gap between the formed body and the outer tube and the small gaps between the formed bodies and the inner tube are necessary so that the formed bodies and the tubes can freely expand under any operating conditions. Furthermore, the process gas should also flow through the small gaps so that the gap surfaces participate in the heat exchange. Between the two different formed bodies, several radial ribs are provided for spacing the molded bodies axially. These ribs form a cross section with open passageways for the free flow of the process gas in the radial direction. By this design, a major part of the process gas is conducted through the molded bodies in a meander form; it flows over the entire surface of the molded bodies and comes in contact alternatingly with the outer and the inner tube via the free annular cross sections so that possible temperature differences in the cross section are quickly equalized. The mentioned ribs which may also take the form of bumps for the axial spacing of the molded bodies can be arranged either on only one side or both sides of the molded bodies. In the latter case the adjacent molded body should desirably have a flat ring surface on both sides.

Figure 1:
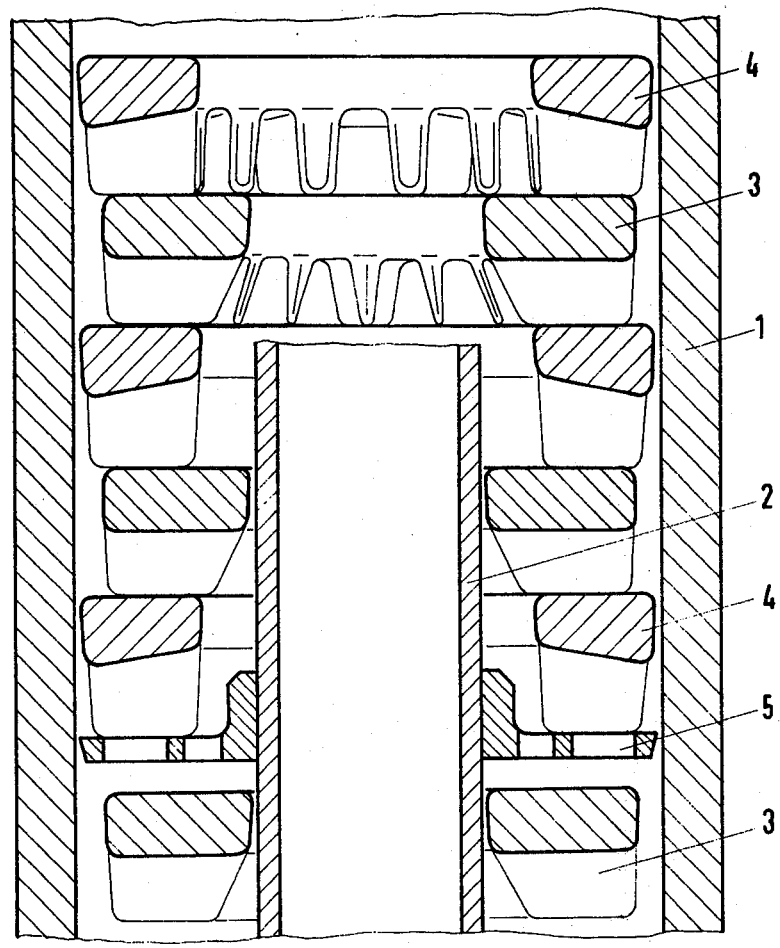
Figure 2:
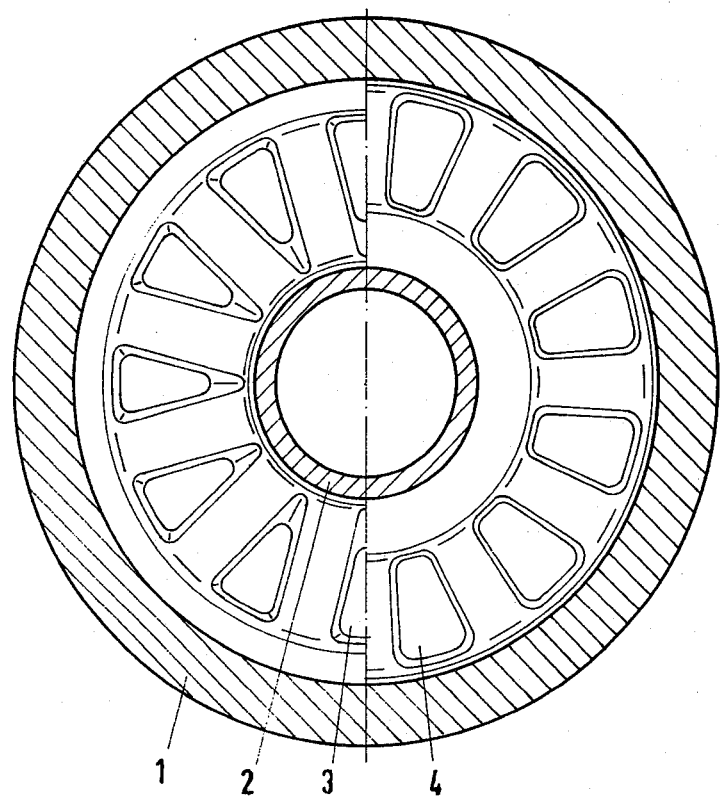
FIG. 2 is a horizontal section taken through the cracking tube of FIG. 1 and shows the spacing of the first and second catalyst bodies and radial ribs between the two bodies particularly with reference to the inner and outer tubes.
Figure 3:
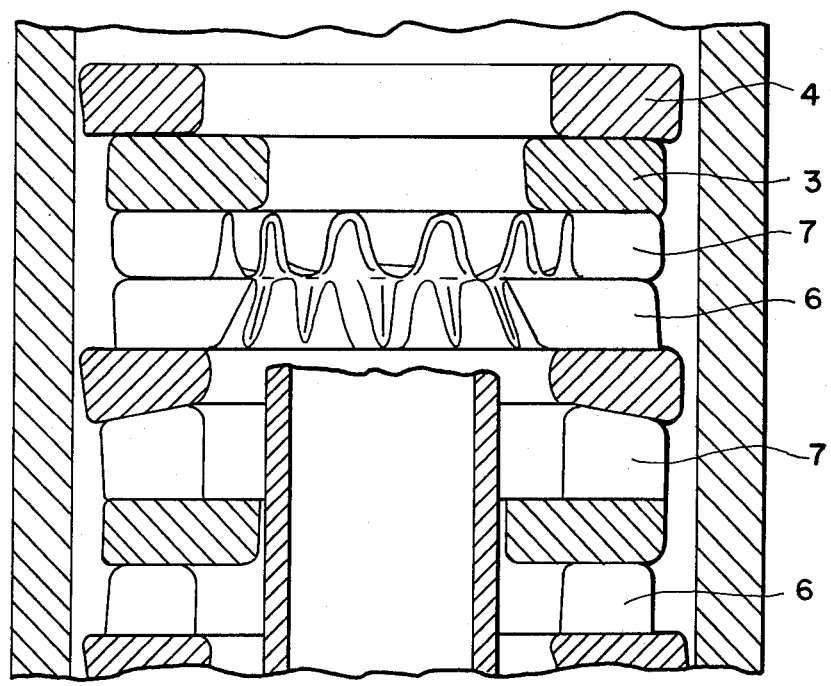
FIG. 3 is a view similar to FIG. 1 but differs particularly in that the first shaped catalyst body has a plane annular surface at its underside and has the ribs on its other side.
Figure 4:
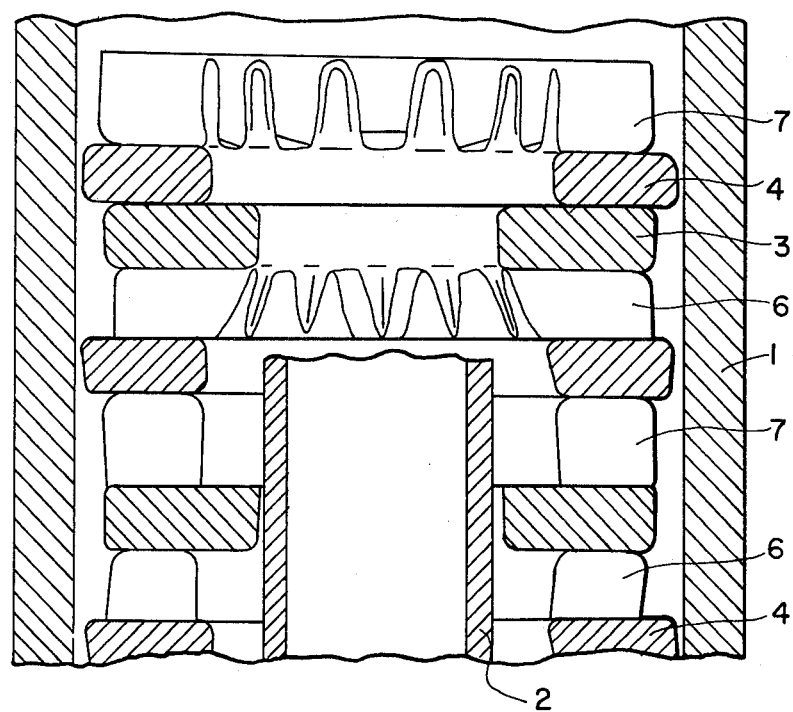
FIG. 4 is another view similar to FIG. 1 but differs in that the second shaped catalyst body has a plane annular surface at its underside and has the ribs on the other side.

FIGS. 1 and 2 show an embodiment example of the invention. FIG. 1 is a vertical longitudinal section through a cracking tube with several formed catalyst bodies. FIG. 2 shows a cross section through FIG. 1. In FIGS. 1 and 2, two different molded catalyst bodies 3 and 4 are arranged between the outer tube 1 and the inner tube 2 which are stacked up on top of each other and several of which are supported on a perforated metallic holding plate 5 which is fastened to the inner tube 2. The outer tube 1 and the inner tube 2 consist of known temperature resistant metallic materials, such as Inconel 617, Hastelloy X and Incaloy 800 H. The two different molded catalyst bodies 3 and 4 are made of a porous ceramic material. They are molded in a special mold and subsequently dried and fired. These formed catalyst bodies can be saturated with a known aqueous nickel salt solution with the nickel contained in this solution becoming catalytically active. In addition, these catalyst bodies can also be prepared from a homogeneous catalytic material, i.e. a carrier material with nickel finely distributed therein. The metallic holding plate 5 is fastened to the inner tube 2 and supports a large number of formed catalyst bodies. Fastening these support plates 5 on the inner tube 2 at regular spacings, avoids supporting the total weight of all formed catalyst bodies arranged in one tube by a single lower support. The two different molded catalyst bodies 3 and 4 each have on their underside several radial ribs 6 and 7 respectively distributed uniformly over the circumference, with radial flow canals in between. Since these molded bodies form alternatingly an empty ring cross section at the outer tube 1 and the inner tube 2 in the axial direction, process gas flowing from the top down is conducted in meander fashion from the outer to the inner tube. The radial flow canals as well as the two different annular spaces are designed so that the free flow cross section as seen in the flow direction remains approximately the same. Therefore, the molded catalyst body 3, has, as seen from the bottom, ribs with approximately triangular cross section, while the molded catalyst body 4, also seen from the bottom, has ribs of approximately trapezoidal cross section with rounded corners.

I claim:

1. Cracking tube apparatus for the catalytic cracking of gases comprising an elongated outer tube closed at one end and which can be externally heated, a concentric inner tube of smaller diameter than the outer tube disposed in the outer tube and with the inner tube open at the closed end of the outer tube to permit flow of from one said tubes to the other of said tubes, an annular space between the outside surface of the inner tube and the inside surface of the outer tube, the apparatus further comprising
    (a) first shaped catalyst bodies and second different shaped catalyst bodies alternately arranged in the annular space,
    (b) said first shaped catalyst bodies being constructed and arranged to extend radially outwardly across the annular space from adjacent the inner tube so as to leave a reduced empty annular space between the first shaped catalyst bodies and the outer tube,
    (c) said second shaped catalyst bodies being constructed and arranged to extend radially inwardly across the annular space from adjacent the outer tube so as to leave a reduced empty annular space between the second shaped catalyst bodies and the inner tube, thereby causing gases passed through the annular space in contact with the catalysts therein to flow in meander fashion from the outer to the inner tube and then to the outer tube, and
    (d) at least one of said first and second shaped bodies having a plurality of radial ribs for axial spacing between said alternately arranged first and second shaped catalyst bodies, and the ribs being constructed and arranged to define openings between the ribs so as to provide for flow of gases in the radial direction between the outer surface of the inner tube and the inner surface of the outer tube.

2. Cracking tube apparatus with catalyst bodies according to claim 1, wherein each of said first shaped bodies has a plane annular surface at its upperside and has several of said radial ribs on its other side.

3. Cracking tube apparatus with catalyst bodies according to claim 1, wherein each of said first shaped bodies has a plane annular surface at its underside and has several of said radial ribs on its other side.

4. Cracking tube apparatus with catalyst bodies according to claim 1, wherein each of said second shaped bodies has a plane annular surface at its upperside and has several of said radial ribs on its other side.

5. Cracking tube apparatus with catalyst bodies according to claim 1, wherein each of said second shaped bodies has a plane annular surface at its underside and has several of said radial ribs on its other side.

* * * * *